United States Patent
Harada et al.

(10) Patent No.: US 8,876,385 B2
(45) Date of Patent: Nov. 4, 2014

(54) BEARING MEMBER AND FLUID DYNAMIC BEARING DEVICE USING SAME

(75) Inventors: Kazuyoshi Harada, Kuwana (JP); Kimihiko Bito, Kuwana (JP); Fuyuki Ito, Kuwana (JP)

(73) Assignee: NTN Corporation, Osaka-shi (JP)

( * ) Notice: Subject to any disclaimer, the term of this patent is extended or adjusted under 35 U.S.C. 154(b) by 9 days.

(21) Appl. No.: 13/699,257

(22) PCT Filed: Apr. 21, 2011

(86) PCT No.: PCT/JP2011/059779
§ 371 (c)(1),
(2), (4) Date: Nov. 20, 2012

(87) PCT Pub. No.: WO2011/145426
PCT Pub. Date: Nov. 24, 2011

(65) Prior Publication Data
US 2013/0071054 A1    Mar. 21, 2013

(30) Foreign Application Priority Data

May 21, 2010  (JP) ................................. 2010-117577
Aug. 27, 2010 (JP) ................................. 2010-191241

(51) Int. Cl.
*F16C 32/06*  (2006.01)
*F16C 33/10*  (2006.01)
*F16C 17/10*  (2006.01)

(52) U.S. Cl.
CPC .......... *F16C 32/0629* (2013.01); *F16C 33/1065* (2013.01); *F16C 17/107* (2013.01); *F16C 33/107* (2013.01)
USPC .......................................... 384/107; 384/114

(58) Field of Classification Search
CPC .... F16C 17/026; F16C 17/102; F16C 17/107; F16C 17/12; F16C 33/1015; F16C 33/104; F16C 33/106; F16C 33/107; F16C 33/1085; F16C 33/128

USPC ................... 384/100, 107, 112–114; 310/90; 360/99.07, 99.08
See application file for complete search history.

(56) References Cited

U.S. PATENT DOCUMENTS 6,105,250 A    8/2000  Tanaka et al.
6,340,854 B1 *  1/2002  Jeong ............................ 384/107
(Continued)

FOREIGN PATENT DOCUMENTS

JP     11-037156 A     2/1999
JP    2001-020956 A    1/2001
(Continued)

OTHER PUBLICATIONS

International Search Report for PCT/JP2011/059779, mailing date of Jul. 19, 2011.

(Continued)

*Primary Examiner* — James Pilkington
(74) *Attorney, Agent, or Firm* — Westerman, Hattori, Daniels & Adrian, LLP

(57) ABSTRACT

A sintered metal bearing member is provided that includes radial bearing surfaces arranged at two regions spaced apart from each other in an axial direction on an inner peripheral surface. The bearing member includes radial dynamic pressure generating portions in contact with the radial bearing surfaces. The radial dynamic pressure generating portions are formed on the radial bearing surfaces. The bearing member includes a thrust bearing surface arranged on at least one of the end surfaces and a thrust dynamic pressure generating portion for generating a dynamic pressure in the lubricating oil in contact with the thrust bearing surface. The thrust dynamic pressure generating portion is formed on the thrust bearing surface. The bearing member includes a middle relief portion arranged between the radial bearing surfaces in the axial direction. The middle relief portion has a larger diameter than the radial bearing surfaces.

19 Claims, 10 Drawing Sheets

(56) References Cited

U.S. PATENT DOCUMENTS

| | | | |
|---|---|---|---|
| 7,690,845 B2 * | 4/2010 | Satoji et al. | 384/100 |
| 2009/0103841 A1 * | 4/2009 | Uenosono et al. | 384/100 |
| 2009/0279819 A1 * | 11/2009 | Hori et al. | 384/124 |

FOREIGN PATENT DOCUMENTS

| | | |
|---|---|---|
| JP | 2004-084864 A | 3/2004 |
| JP | 2007-46665 A | 2/2007 |
| JP | 2008-200734 A | 9/2008 |
| JP | 2009-097672 A | 5/2009 |
| JP | 2010-106994 A | 5/2010 |

OTHER PUBLICATIONS

Notification of Transmittal of Translation of the International Preliminary Report on Patentability (Form PCT/IB/338) (1 page) of International Application No. PCT/JP2011/059779 mailed Apr. 21, 2011 with Forms PCT/IB/373 (1 page) and PCT/ISA/237 (5 pages).
Japanese Office Action dated Nov. 21, 2013, issued in Japanese Patent Application No. 2010-117577.
Japanese Office Action dated Nov. 21, 2013, issued in Japanese Patent Application No. 2010-191241.

* cited by examiner

BEARING MEMBER AND FLUID DYNAMIC BEARING DEVICE USING SAME

BACKGROUND OF THE INVENTION

1. Field of the Invention

The present invention relates to a fluid dynamic bearing device for supporting a shaft member with a dynamic pressure of a lubricating oil in radial bearing gaps between an inner peripheral surface of a bearing member and an outer peripheral surface of the shaft member in a manner that relative rotation of the shaft member is freely allowed, and to a bearing member used in the fluid dynamic bearing device.

Fluid dynamic bearing devices have high rotational accuracy and are excellent in quietness, and hence are suitably used in the following: a spindle motor for various disk drive devices (such as a magnetic disk drive device for HDDs and an optical disk drive device for CD-ROMs and the like); a polygon scanner motor for laser beam printers (LBPs); a color-wheel motor for projectors; or small motors such as a fan motor used, for example, for cooling electrical devices.

For example, in the fluid dynamic bearing device disclosed in Patent Literature 1, radial bearing surfaces (regions in which dynamic pressure generating grooves are formed) are formed at two regions spaced apart from each other in an axial direction of an inner peripheral surface of a bearing member, and a thrust bearing surface (region in which dynamic pressure generating grooves are formed) is formed in an end surface of the bearing member. A middle relief portion slightly larger in diameter than the radial bearing surfaces at the two regions is provided therebetween in the axial direction. With this, rotational torque of the shaft member is reduced.

As a method of manufacturing the bearing member provided with the middle relief portion as described above, for example, as disclosed in Patent Literature 2, there is a method of forming dynamic pressure generating grooves in an inner peripheral surface of a bearing member, including: compressing, under a state in which a core rod is inserted along an inner periphery of the bearing member, parts of an axial region of an outer peripheral surface of the bearing member; pressing the inner peripheral surface of the bearing member onto molding dies formed on an outer peripheral surface of the core rod; and transferring shapes of the molding dies to the inner peripheral surface of the bearing member. In this case, a region (middle relief portion) out of regions in which the dynamic pressure generating grooves are formed (radial bearing surfaces) is formed to be larger in diameter than the radial bearing surfaces.

2. Description of Related Art

Patent Literature 1: JP 2007-46665 A
Patent Literature 2: JP 11-037156 A

SUMMARY OF THE INVENTION

The dynamic pressure generating grooves in each of the radial bearing surfaces increase pressure of a lubricating oil on the radial bearing surfaces by drawing the lubricating oil at both axial end portions of the dynamic pressure generating grooves into an axial central portion of the dynamic pressure generating grooves. Thus, in a space opposed to the middle relief portion (hereinafter referred to as middle relief space), the lubricating oil is drawn to the radial bearing surface sides provided on both axial sides of the middle relief portion, and hence negative pressure is liable to be generated. When negative pressure is generated in the lubricating oil, air mixed in the lubricating oil appears as bubbles, which may deteriorate rotational accuracy, durability, and reliability of the fluid dynamic bearing device.

For example, in the fluid dynamic bearing device disclosed in Patent Literature 1 above, generation of negative pressure in the middle relief space is prevented by forming the dynamic pressure generating grooves in the radial bearing surfaces asymmetrically with each other in the axial direction so that the lubricating oil is forcibly fed into the middle relief space. However, when the dynamic pressure generating grooves are formed asymmetrically with each other in the axial direction in this way, it is inevitable to weaken a pumping effect of drawing the lubricating oil into the axial central portion between the dynamic pressure generating grooves, and hence rigidity of the bearing is reduced.

Further, it has been conceived that, in order to form the radial dynamic pressure generating portions reliably to end portions by the method disclosed in Patent Literature 2 above, on the outer peripheral surface of the bearing member, it is necessary to compress regions larger than an axial width of the radial dynamic pressure generating portions (refer to paragraph [0015] of Patent Literature 2 above). However, in this case, the middle relief portion adjacent to the radial dynamic pressure generating portions is also compressed from an outer diameter side. Thus, a diameter of the middle relief portion is reduced. As a result, a gap between the middle relief portion and the shaft member is reduced, which leads to an increase in torque.

It is therefore objects of the present invention to prevent generation of negative pressure in the middle relief space opposed to the middle relief portion of the bearing member, to avoid deterioration in bearing rigidity caused by deterioration in pumping effect of the dynamic pressure generating grooves, and to reduce rotational torque while sufficiently increasing a diameter of the middle relief portion and forming the radial dynamic pressure generating portions with high accuracy.

In order to achieve the above-mentioned object, the present invention provides a bearing member formed of a sintered metal, comprising: radial bearing surfaces provided at two regions spaced apart from each other in an axial direction on an inner peripheral surface; radial dynamic pressure generating portions for generating a dynamic pressure in a lubricating oil in contact with the radial bearing surfaces, the radial dynamic pressure generating portions being formed respectively on the radial bearing surfaces; a thrust bearing surface provided on at least one of end surfaces; a thrust dynamic pressure generating portion for generating a dynamic pressure in the lubricating oil in contact with the thrust bearing surface, the thrust dynamic pressure generating portion being formed on the thrust bearing surface; and a middle relief portion provided between the radial bearing surfaces in the axial direction and being larger in diameter than the radial bearing surfaces.

When the bearing member is formed of a sintered metal comprising the middle relief portion, the lubricating oil can be impregnated and retained in inner pores of the sintered metal. Thus, when the lubricating oil in a middle relief space is drawn into the radial bearing surface sides and oil pressure in the middle relief space decreases, the lubricating oil impregnated in the inner pores of the bearing member is drawn out from surface pores of the middle relief portion and supplied into the middle relief space. Thus, generation of negative pressure in the middle relief portion is prevented.

When the above-mentioned bearing member further comprises high density portions in each of which density of the sintered metal is relatively high (number of the inner pores is small) and a low density portion in which the density of the sintered metal is relatively low (number of the inner pores is large), an amount of oil impregnated in the low density portion is larger than an amount of oil impregnated in the high density portion. Thus, when the radial bearing surfaces are formed respectively on inner peripheral surfaces of the high density portions and the middle relief portion is formed on an inner peripheral surface of the low density portion in which the relatively large amount of oil is impregnated, a larger amount of oil can be supplied to the middle relief space.

For example, when the radial dynamic pressure generating portions are formed on the inner peripheral surface of the bearing member by compressing parts of a region of an outer peripheral surface of the bearing member to an inner diameter side so that the inner peripheral surface of the bearing member is pressed onto molding dies, the radial bearing surfaces of the bearing member are compressed in a radial direction. Thus, those regions are formed to be the high density portions. Meanwhile, the middle relief portion is not compressed, and hence is formed to be the low density portion.

In the above-mentioned bearing member, the lubricating oil impregnated in the inner pores can be supplied by an ample amount from the middle relief portion as the low density portion into the middle relief space. Thus, even when the radial dynamic pressure generating portions are not formed asymmetrically with each other in the axial direction, generation of negative pressure in the middle relief space is prevented. Therefore, the radial dynamic pressure generating portions can be formed symmetrically with each other in the axial direction, and hence the bearing member can be designed with a higher degree of freedom. In addition, with this configuration, a pumping effect is maximized, and hence bearing rigidity can be enhanced.

Further, when the thrust dynamic pressure generating portion draws the lubricating oil in the thrust bearing gap from an outer diameter side to the inner diameter side, the lubricating oil can be more actively fed into the middle relief space through the radial bearing gaps.

When the bearing member further comprises an axial groove formed in the outer peripheral surface, pressure balance of the lubricating oil can be maintained by communicating the lubricating oil through this axial groove.

The bearing member as described above can be incorporated into a fluid dynamic bearing device comprising a shaft member which is inserted along an inner periphery of the bearing member and which comprises a shaft portion and a flange portion, wherein radial bearing gaps are formed between the radial bearing surfaces of the bearing member and an outer peripheral surface of the shaft portion, and wherein a thrust bearing gap is formed between the thrust bearing surface of the bearing member and an end surface of the flange portion.

In this fluid dynamic bearing device, when the outer peripheral surface of the bearing member comprises: a large-diameter outer peripheral surface fixed to an inner peripheral surface of a housing; and a small-diameter outer peripheral surface to form a radial gap between the small-diameter outer peripheral surface and the inner peripheral surface of the housing, and the radial bearing gap is communicated to the radial bearing gaps, the lubricating oil in the radial bearing gaps can be flown into the radial gap, and the lubricating oil can be made to intrude from the outer peripheral surface of the bearing member into the inner pores. In this case, when the thrust bearing surface is formed on an end surface of the bearing member on the large-diameter outer peripheral surface side, an area of the thrust bearing surface can be increased. Thus, supportability in a thrust direction can be enhanced.

Further, in this case, when much lubricating oil intrudes from the small-diameter outer peripheral surface, there is a risk that the lubricating oil does not reach the middle relief portion and the lubricating oil cannot be supplied by a sufficient amount into the middle relief space. As a countermeasure, the high density portions and the low density portion are provided to the bearing member, the small-diameter outer peripheral surface is formed on an outer peripheral surface of one of the high density portions, and the large-diameter outer peripheral surface is formed on an outer peripheral surface of the low density portion. With this, intrusion of the lubricating oil from the small-diameter outer peripheral surface can be suppressed, and hence the lubricating oil can be reliably supplied by a sufficient amount into the middle relief space.

Further, when a position in the axial direction of the small-diameter outer peripheral surface is extended to a range in the axial direction of the middle relief portion, the lubricating oil can be flown into a region closer to the middle relief portion through the radial gap between the small-diameter outer peripheral surface and the inner peripheral surface of the housing. Thus, supply of the lubricating oil into the middle relief space can be further promoted.

In this fluid dynamic bearing device, the bearing member is provided with the middle relief portion, and hence it is unnecessary to provide a recess portion on the shaft side as a measure to reduce torque, and the outer peripheral surface of the shaft portion can be formed to be a smooth cylindrical surface. Thus, the shape of the shaft member is simplified, with the result that manufacturing cost can be reduced. In particular, when the shaft member is formed by bonding the shaft portion and the flange portion separately formed to each other, the shaft portion can be formed into a perfectly straight shape. Thus, manufacture of the shaft portion is further more simplified, with the result that manufacturing cost can be reduced and dimensional accuracy of the outer peripheral surface can be enhanced.

In order to achieve the above-mentioned another object, the present invention provides a bearing member, comprising: a radial dynamic pressure generating portion for generating a dynamic pressure in a lubricating oil in a radial bearing gap, the radial dynamic pressure generating portion being formed on an inner peripheral surface; and a middle relief portion formed in a region adjacent to one side in an axial direction of the radial dynamic pressure generating portion and being larger in diameter than the radial dynamic pressure generating portion, wherein the radial dynamic pressure generating portion is formed by compressing a part of an axial region of an outer peripheral surface of the bearing member to an inner diameter side so that the inner peripheral surface of the bearing member is pressed onto a molding die, and wherein an end portion on one side in the axial direction of a compression mark left on the outer peripheral surface of the bearing member as a result of the compression falls within an axial region of the radial dynamic pressure generating portion.

Further, in order to achieve the above-mentioned another object, the present invention provides a method of manufacturing a bearing member, comprising: forming a radial dynamic pressure generating portion by compressing a part of an axial region of an outer peripheral surface of the bearing member to an inner diameter side so that an inner peripheral surface of the bearing member is pressed onto a molding die, and forming a middle relief portion larger in diameter than the radial dynamic pressure generating portion in a region adjacent to one side in the axial direction of the radial dynamic pressure generating portion, wherein an end portion on one side in the axial direction of a region in which the outer peripheral surface of the bearing member is compressed falls within an axial region of the radial dynamic pressure generating portion.

Conventionally, it has been conceived that, in order to form the radial dynamic pressure generating portion by compressing the outer peripheral surface of the bearing member to the inner diameter side as described above, it is necessary to compress an area wider than an axial width of the radial dynamic pressure generating portion. The present invention has been made to supersede such a conventional technical common sense, specifically, based on an idea of maintaining the end portion on the one side in the axial direction (middle relief portion side) of the region in which the outer peripheral surface of the bearing member is compressed within the axial region of the radial dynamic pressure generating portion. With this, the middle relief portion on the inner peripheral surface of the bearing member is free from being compressed from the outer diameter side, and hence the middle relief portion can be formed to be sufficiently large in diameter in comparison with the radial dynamic pressure generating portion. As a result, torque can be reduced.

Detailed description of the above-mentioned content is made with reference to FIG. 10. An outer peripheral surface 8d of a shaft member 8 illustrated in FIG. 10(c) is compressed so that radial dynamic pressure generating portions (in the illustration, dynamic pressure generating grooves G1 and G2 in a herringbone pattern) are formed at two regions spaced apart from each other in the axial direction on an inner peripheral surface 8a of the bearing member and that a middle relief portion E is formed between the dynamic pressure generating grooves G1 and G2 in the axial direction. FIGS. 10(a) and 10(b) each illustrate a shape of the inner peripheral surface 8a of the bearing sleeve 8 in an exaggerated manner. The abscissa axis represents a position in the axial direction of the inner peripheral surface 8a, and the ordinate axis represents a radial position of the inner peripheral surface 8a (upper side corresponds to inner diameter side). As illustrated in FIGS. 10(a) and 10(b), in both compressed regions P and compressed regions P', the inner peripheral surface 8a is reduced in diameter, and the dynamic pressure generating grooves G1 and G2 are formed. Further, in uncompressed regions Q and Q' respectively between the compressed regions P and the compressed regions P' in the axial direction, the inner peripheral surface 8a is not completely free from being reduced in diameter, specifically, gradually reduced in diameter toward the compressed regions P from a central portion in the axial direction as a deepest portion. Thus, as illustrated in FIG. 10(a), when the compressed regions P' on the outer peripheral surface 8d of the bearing sleeve 8 are wider than widths in the axial direction of regions in which the dynamic pressure generating grooves G1 and G2 are formed, vicinities of both end portions in the axial direction of the middle relief portion E are compressed from the outer diameter side. As a result, a depth $D_E$ of the deepest portion of the middle relief portion E is reduced. In contrast, as illustrated in FIG. 10(b), when the compressed regions P do not overlap the middle relief portion E, in other words, end portions P0 of the compressed regions P on the middle relief portion E side respectively fall within the regions in which the dynamic pressure generating grooves G1 and G2 are formed, reduction in diameter of the middle relief portion E by the compression is suppressed. As a result, the depth $D_E$ of the deepest portion of the middle relief portion E increases. In this case, parts of the dynamic pressure generating grooves G1 and G2, which overlap the uncompressed region Q, are reduced in diameter together with the compressed regions P and pressed onto molding dies. Thus, the dynamic pressure generating grooves G1 and G2 can be formed reliably up to the end portions on the middle relief portion E side.

For example, the outer peripheral surface of the bearing member can be compressed by forming a large-diameter outer peripheral surface in a part of the axial region of the outer peripheral surface of the bearing member and by inserting this large-diameter outer peripheral surface of the bearing member into a molding hole of a die, which is smaller in diameter than the large-diameter outer peripheral surface. In this case, on the outer peripheral surface of the bearing member, a region in which a compression mark is left is equal to or larger in diameter than a region adjacent to one side in the axial direction (middle relief portion side).

Alternatively, the outer peripheral surface of the bearing member can be compressed by forming a small-diameter inner peripheral surface in a part of an axial region of the molding hole of the die and by inserting the bearing member larger in diameter than this small-diameter inner peripheral surface with respect to the small-diameter inner peripheral surface of the die. In this case, on the outer peripheral surface of the bearing member, a region in which a compression mark is left is smaller in diameter than a region adjacent to one side in the axial direction (middle relief portion side).

On the inner peripheral surface of the bearing member, when a difference in diameter between a maximum diameter of the middle relief portion and a minimum diameter of a radial dynamic pressure generating portion is set to be four times or more larger than a difference in diameter between a maximum diameter and the minimum diameter of the radial dynamic pressure generating portion, low torque can be stably obtained.

When the compression mark and the radial dynamic pressure generating portion are each provided at two regions spaced apart from each other in the axial direction, by setting an interval between the two compression marks in the axial direction to 40% or more of an entire length in the axial direction of the bearing member, the diameter of the middle relief portion can be sufficiently increased. As a result, low torque can be stably obtained. In this case, it is preferred that an interval between the two radial dynamic pressure generating portions in the axial direction be set to 30% or more of the entire length in the axial direction of the bearing member.

A thrust dynamic pressure generating portion may be formed on an end surface of the bearing member as described above. In such a case, when the thrust dynamic pressure generating portion is formed on the end surface of the bearing member with a die set for forming the radial dynamic pressure generating portions, manufacturing cost can be reduced.

As described above, according to the present invention, generation of negative pressure in the middle relief portion is prevented by employing the bearing member comprising a middle relief portion formed of a sintered metal. With this, the radial dynamic pressure generating portion can be configured to maximize a pumping effect, and hence bearing rigidity can be enhanced.

Further, as described above, according to the present invention, in the bearing member provided with the radial dynamic pressure generating portion formed by compressing the part of the axial region of the outer peripheral surface, torque can be reduced while sufficiently increasing a diameter of the middle relief portion and forming the radial dynamic pressure generating portion with high accuracy.

DETAILED DESCRIPTION OF INVENTION

In the following, description is made of embodiments of the present invention with reference to the drawings.

Figure 1:
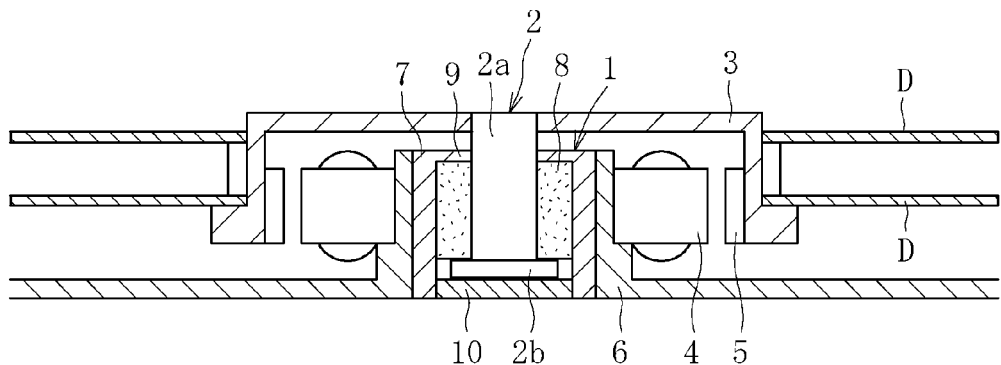
FIG. 1 A sectional view of a spindle motor.

FIG. 1 illustrates a spindle motor used for a disk drive device of, for example, a 2.5-inch HDD. The spindle motor comprises a fluid dynamic bearing device 1 for supporting a shaft member 2 in a non-contact manner so that the shaft member 2 is freely rotatable, a disk hub 3 mounted to the shaft member 2, a bracket 6 to which the fluid dynamic bearing device 1 is fixed, and stator coils 4 and a rotor magnet 5 facing each other across a radial gap. The stator coils 4 are fixed to the bracket 6, and the rotor magnet 5 is fixed to the disk hub 3. The disk hub 3 holds a predetermined number (two in the illustration) of disks D such as a magnetic disk. When the stator coils 4 are energized, the rotor magnet 5 is relatively rotated by an electromagnetic force generated between the stator coils 4 and the rotor magnet 5. With this, the disk hub 3, the disks D, and the shaft member 2 are rotated integrally with each other.

Figure 2:
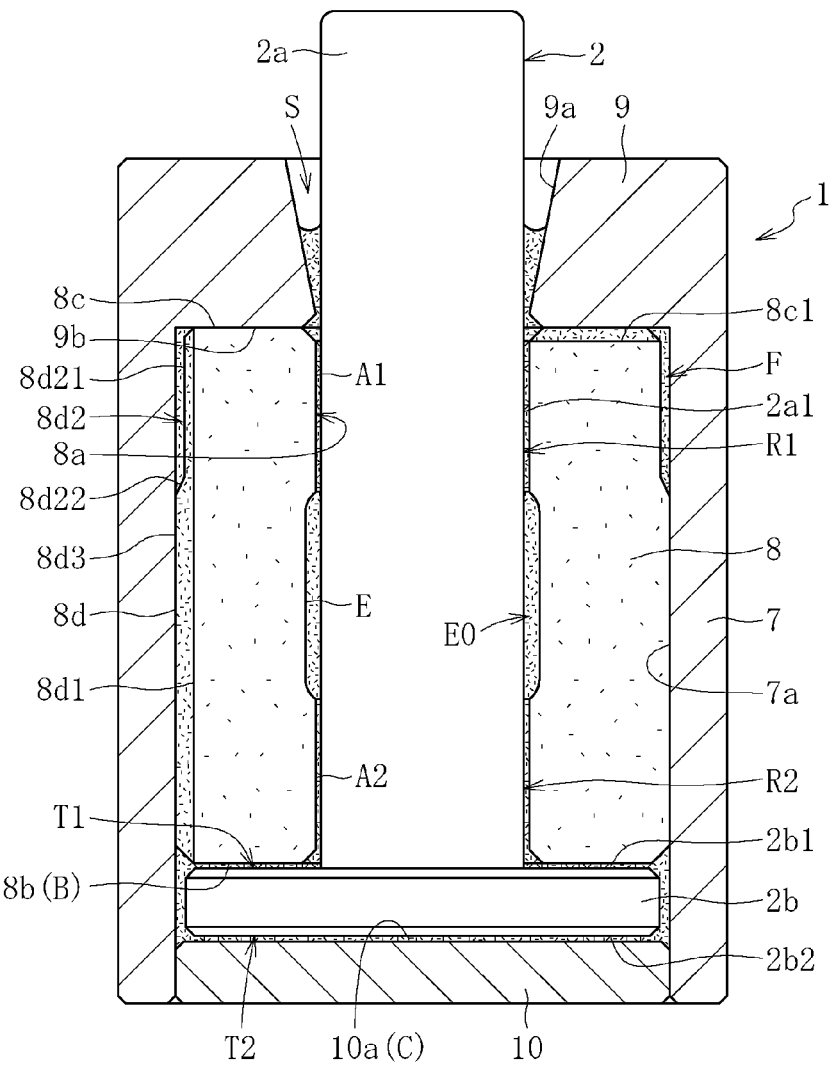
FIG. 2 A sectional view of a fluid dynamic bearing device.

As illustrated in FIG. 2, the fluid dynamic bearing device 1 comprises the shaft member 2, a bearing member (bearing sleeve 8) having an inner periphery along which the shaft member 2 is inserted, a housing 7 having an inner peripheral surface to which the bearing sleeve 8 is fixed and opened on both sides in the axial direction, a sealing portion 9 for sealing an opening portion on one side in the axial direction of the housing 7, and a lid member 10 for closing an opening portion on another side in the axial direction of the housing 7. In this embodiment, the housing 7 and the sealing portion 9 are formed integrally with each other. Note that, for the sake of convenience in the following description, the sealing portion 9 side in the axial direction is referred to as an upper side, and the lid member 10 side in the axial direction is referred to as a lower side.

The shaft member 2 comprises a shaft portion 2a and a flange portion 2b provided at a lower end of the shaft portion 2a. The shaft portion 2a is formed into a shape of a straight solid shaft, and has an outer peripheral surface 2a1 formed to be a smooth cylindrical surface. The flange portion 2b projects from the lower end portion of the shaft portion 2a toward an outer diameter to have a disk-like shape, and has both end surfaces each formed as a flat surface. In this embodiment, the shaft portion 2a and the flange portion 2b are separately made of a metal material such as an ingot material, more specifically, stainless steel, and then integrated with each other by bonding such as welding. In this way, the shaft member 2 is formed.

The bearing sleeve 8 is obtained by forming a sintered metal, in particular, a sintered metal containing a copper-based metal or a copper-iron based metal as a main component into a substantially cylindrical shape.

Figure 3:
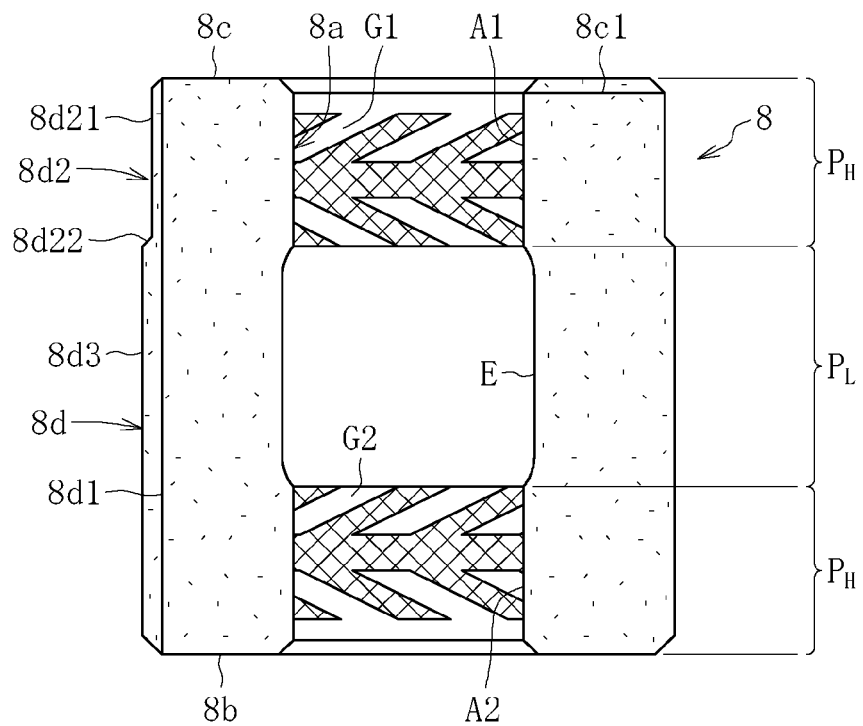
FIG. 3 A sectional view of a bearing sleeve.

On an inner peripheral surface 8a of the bearing sleeve 8, radial bearing surfaces A1 and A2 are provided at two regions spaced apart from each other in the axial direction, and a middle relief portion E larger in diameter than the radial bearing surfaces A1 and A2 is provided therebetween in the axial direction. The radial bearing surfaces A1 and A2 face radial bearing gaps, and the middle relief portion E faces a middle relief space E0. A radial dynamic pressure generating portion is formed on each of the radial bearing surfaces A1 and A2. In this embodiment, for example, there are respectively formed dynamic pressure generating grooves G1 and G2 in a herringbone pattern as illustrated in FIG. 3. In FIG. 3, hill portions relatively higher than (projected radially inward with respect to) other regions are indicated by cross-hatching, and the dynamic pressure generating grooves G1 and G2 are formed between the hill portions. The dynamic pressure generating grooves G1 and G2 in the illustration each have a shape symmetrical in the axial direction.

Figure 4:
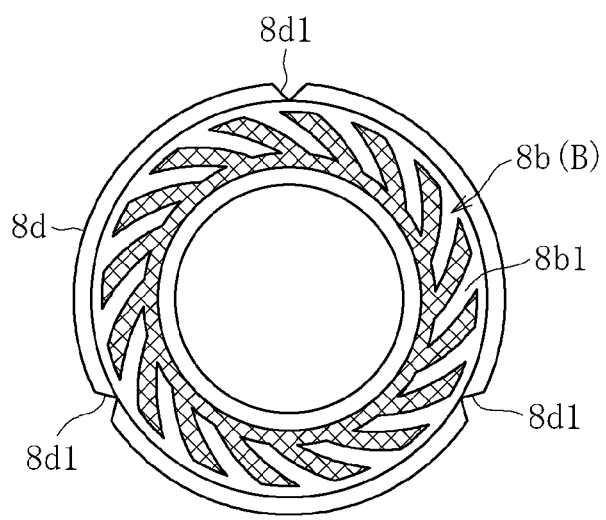
FIG. 4 A bottom view of the bearing sleeve.

A thrust bearing surface B to face a thrust bearing gap is formed on a lower end surface 8b of the bearing sleeve 8. As illustrated in FIG. 4, dynamic pressure generating grooves 8b1, for example, in a spiral pattern are formed in the thrust bearing surface B. In FIG. 4, hill portions relatively higher than other regions are indicated by cross-hatching, and the dynamic pressure generating grooves 8b1 are formed between the hill portions. The dynamic pressure generating grooves 8b1 in a spiral pattern are what is called pump-in type dynamic pressure generating grooves which draw a lubricating oil into an inner diameter side in accordance with relative rotation of the shaft member 2.

An axial groove 8d1 is formed over the entire axial length of an outer peripheral surface 8d of the bearing sleeve 8. In this embodiment, the axial groove 8d1 comprises a plurality of (for example, three) equiangularly arranged axial grooves 8d1 (refer to FIG. 4). Further, a radial grooves 8c1 is formed over the entire radial length of an upper end surface 8c of the bearing sleeve 8 (refer to FIG. 3). In this embodiment, the radial groove 8c1 comprises a plurality of (for example, three) equiangularly arranged radial grooves 8c1 (not shown). Those axial grooves 8d1 and radial grooves 8c1 form communication paths for the lubricating oil.

On the outer peripheral surface 8d of the bearing sleeve 8, a small-diameter outer peripheral surface 8d2 is formed on an outer diameter side with respect to the upper radial bearing surface A1, and a large-diameter outer peripheral surface 8d3 is formed below the small-diameter outer peripheral surface 8d2. The small-diameter outer peripheral surface 8d2 comprises a cylindrical portion 8*d*21, and a tapered portion 8*d*22 connecting the cylindrical portion 8*d*21 and the large-diameter outer peripheral surface 8*d*3 to each other. In the illustration, a lower end portion of the small-diameter outer peripheral surface 8*d*2 is arranged at substantially the same position in the axial direction as that of a lower end portion of the upper radial bearing surface A1 (region in which dynamic pressure generating grooves G1 are formed).

The bearing sleeve 8 comprises high density portions $P_H$ provided at two regions spaced apart from each other in the axial direction and a low density portion $P_L$ provided between the high density portions $P_H$ in the axial direction. The radial bearing surfaces A1 and A2 are formed on inner peripheral surfaces of the high density portions $P_H$. The small-diameter outer peripheral surface 8*d*2 is formed on an outer peripheral surface of the upper high density portion $P_H$, and the middle relief portion E is formed on an inner peripheral surface of the low density portion $P_L$. The high density portions $P_H$ are higher in density of a sintered metal than the low density portion $P_L$, and hence lower in internal porosity and surface porosity. Thus, for example, through measurement of the surface porosity and porosity in axial cross-section of the bearing sleeve 8, regions in which the high density portions $P_H$ and the low density portion $P_L$ are formed can be confirmed.

Here, description is made of a method of manufacturing the bearing sleeve 8. The bearing sleeve 8 is manufactured through a compression molding step, a sintering step, and a sizing step.

Figure 5:
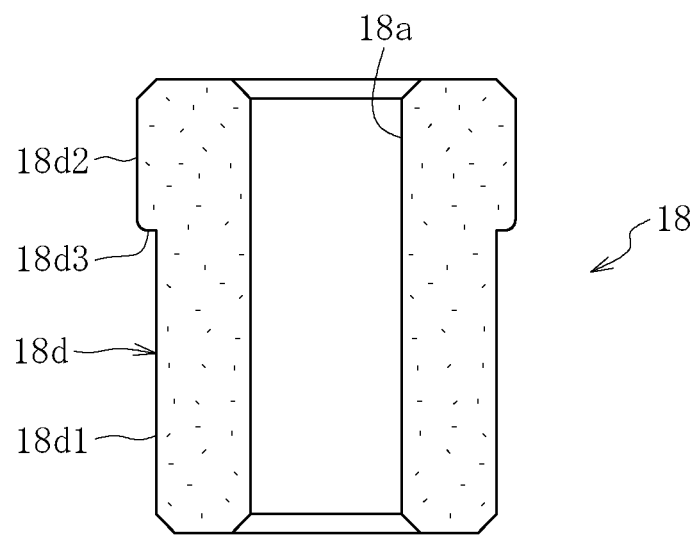
FIG. 5 A sectional view of a green compact.

First, in the compression molding step, metal powder is subjected to compression molding so that a green compact 18 as illustrated in FIG. 5 is formed. An inner peripheral surface 18*a* of the green compact 18 is formed to be a smooth cylindrical surface. An outer peripheral surface 18*d* of the green compact 18 is provided with a small-diameter outer peripheral surface 18*d*1 having the same diameter as an outer diameter dimension of the outer peripheral surface 8*d* of the bearing sleeve 8, a large-diameter outer peripheral surface 18*d*2 provided above the small-diameter outer peripheral surface 18*d*1, and a shoulder surface 18*d*3 formed therebetween. The small-diameter outer peripheral surface 18*d*1 and the large-diameter outer peripheral surface 18*d*2 are each formed to be a cylindrical surface.

Figure 6:
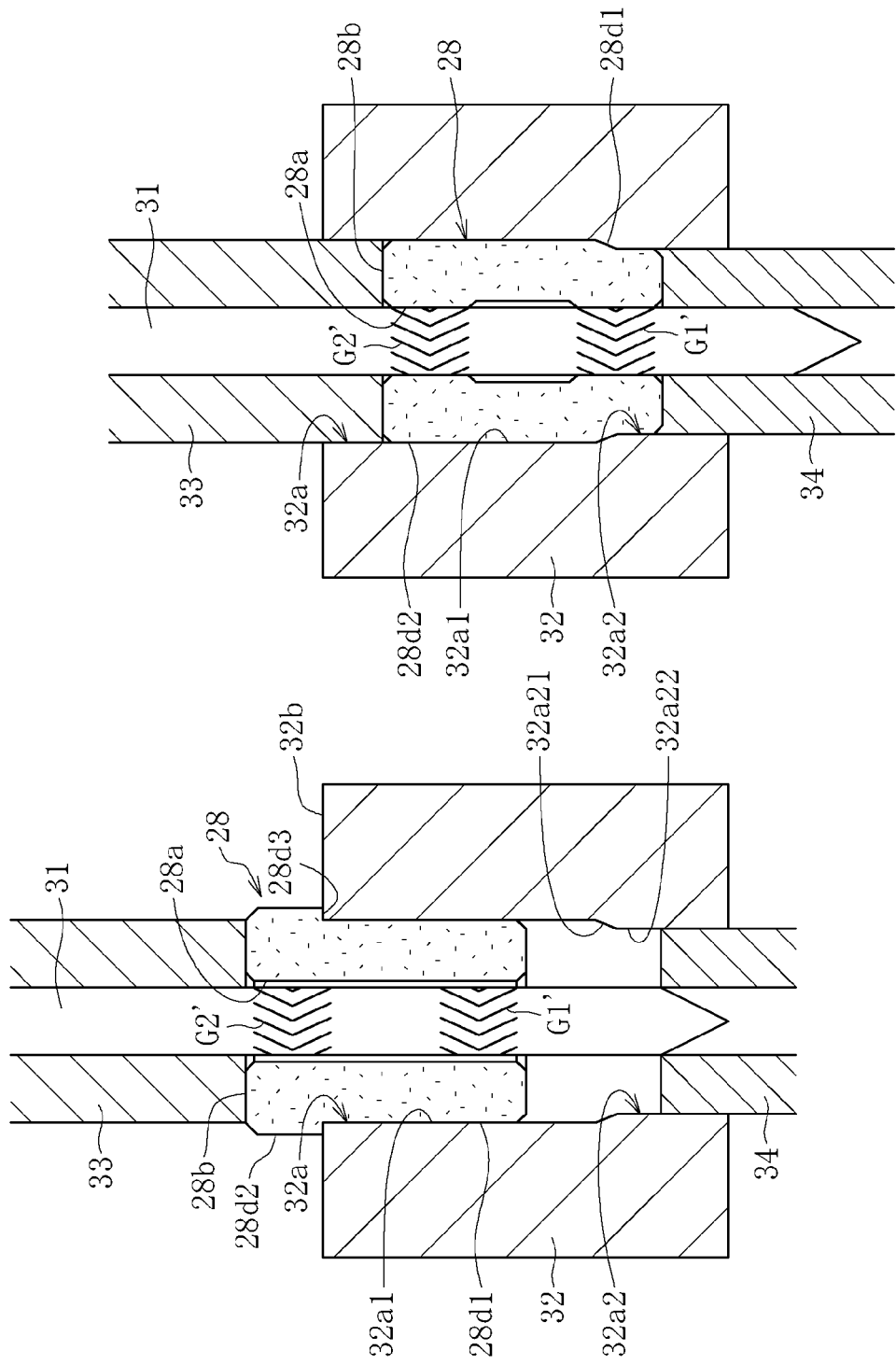
FIG. 6a A sectional view illustrating a sizing step for the bearing sleeve.
FIG. 6b Another sectional view illustrating the sizing step for the bearing sleeve.

By sintering the green compact 18 thorough the sintering step, a sintered compact 28 is obtained. The sintered compact 28 is transferred to the sizing step so as to be sized into a predetermined shape. The sizing step is performed with use of a sizing die set illustrated in FIG. 6. This sizing die set comprises a core rod 31, a die 32, an upper punch 33, and a lower punch 34. Note that, the sintered compact 28 illustrated in FIG. 6 is arranged upside-down with respect to the bearing sleeve 8 illustrated in FIG. 3, and hence the dynamic pressure generating grooves G1 and the dynamic pressure generating grooves G2 are formed respectively at a lower part and an upper part of an inner peripheral surface 28*a* of the sintered compact 28 illustrated in FIG. 6. In the following, description is made of the sizing step with reference to a vertical direction illustrated in FIG. 6 (upsize-down with respect to the vertical direction illustrated in FIGS. 1 and 2).

Molding dies G1' and G2' for molding the dynamic pressure generating grooves G1 and G2 (refer to FIG. 3) are formed on an outer peripheral surface of the core rod 31. In other words, the molding dies G1' and G2' are formed of recessed portions having the same shape as that of the hill portions indicated by cross-hatching in FIG. 3. An outer diameter dimension of the core rod 31 is set to be somewhat smaller than an inner diameter dimension of the sintered compact 28.

A molding hole 32*a* of the die 32 comprises a cylindrical portion 32*a*1 provided on an inlet side (upper side) and a narrow portion 32*a*2 provided on a deep side (lower side). The cylindrical portion 32*a*1 is formed to have a diameter substantially equal to or slightly larger than that of a small-diameter outer peripheral surface 28*d*1 of the sintered compact 28, and smaller than a large-diameter outer peripheral surface 28*d*2 of the sintered compact 28. The narrow portion 32*a*2 comprises a tapered portion 32*a*21 having a diameter radially reduced to the deep side, and a cylindrical portion 32*a*22 provided on a deeper side with respect to the tapered portion 32*a*21. The cylindrical portion 32*a*22 is formed to have a diameter smaller than that of the small-diameter outer peripheral surface 28*d*1 of the sintered compact 28.

Another molding die for forming the dynamic pressure generating grooves of the thrust bearing surface B of the bearing sleeve 8 is formed on a lower surface of the upper punch 33 (not shown).

The sizing step using the above-mentioned sizing die set is performed by the following procedure. First, as illustrated in FIG. 6(*a*), the sintered compact 28 is arranged at an inlet portion of the molding hole 32*a* of the die 32. Specifically, the small-diameter outer peripheral surface 28*d*1 of the sintered compact 28 is inserted into the cylindrical portion 32*a*1 of the molding hole 32*a* of the die 32, and a shoulder surface 28*d*3 of an outer peripheral surface 28*d* of the sintered compact 28 is arranged in engagement with an upper end surface 32*b* of the die 32. Then, the core rod 31 is inserted along an inner periphery of the sintered compact 28. At this time, a radial gap is formed between the core rod 31 and the sintered compact 28. In a state illustrated in FIG. 6(*a*), a lower end portion of the large-diameter outer peripheral surface 28*d*2 of the sintered compact 28 is arranged at substantially the same position in the axial direction as that of a lower end portion of the molding die G2'.

In this state, an end surface 28*b* of the sintered compact 28 is pressed downward with the upper punch 33 so that the sintered compact 28, the core rod 31, and the upper punch 33 are integrally lowered and that the large-diameter outer peripheral surface 28*d*2 of the sintered compact 28 is pressed into the cylindrical portion 32*a*1 of the molding hole 32*a* of the die 32. With this, the large-diameter outer peripheral surface 28*d*2 of the sintered compact 28 is compressed to an inner diameter side, and, on this inner diameter side, the inner peripheral surface 28*a* of the sintered compact 28 is pressed onto the molding die G2' formed on the outer peripheral surface of the core rod 31. With this, a shape of the molding die G2' is transferred to the inner peripheral surface 28*a* of the sintered compact 28. In this way, the dynamic pressure generating grooves G2 are formed.

Simultaneously, the small-diameter outer peripheral surface 28*d*1 of the sintered compact 28 is pressed into the narrow portion 32*a*2 of the molding hole 32*a* of the die 32. With this, the small-diameter outer peripheral surface 28*d*1 of the sintered compact 28 is compressed to the inner diameter side, and, on this inner diameter side, the inner peripheral surface 28*a* of the sintered compact 28 is pressed onto the molding die G1' formed on the outer peripheral surface of the core rod 31. With this, a shape of the molding die G1' is transferred to the inner peripheral surface 28*a* of the sintered compact 28. In this way, the dynamic pressure generating grooves G1 are formed. At this time, on the outer peripheral surface 28*d* of the sintered compact 28, a cylindrical portion and a tapered portion are formed in conformity with a shape of the narrow portion 32*a*2 of the molding hole 32*a* of the die 32.

Then, after a lower end portion of the sintered compact 28 abuts against the lower punch 34, the upper punch 33 is somewhat further lowered so that the sintered compact 28 is compressed by the upper punch 33 and the lower punch 34 from above and below. With this, the another molding die on the lower surface of the upper punch 33 is pressed onto the end surface 28*b* of the sintered compact 28 and the dynamic pressure generating grooves are formed in the end surface 28*b*.

After that, the core rod 31, the upper punch 33, and the lower punch 34 are raised in conjunction with each other, and the sintered compact 28 (bearing sleeve 8) thus formed is pulled out from the molding hole 32*a* of the die 32 (not shown). At this time, the inner peripheral surface 28*a* of the sintered compact 28 slightly increases in diameter by springback. With this, at the time of pulling out the sintered compact 28 from the core rod 31, the dynamic pressure generating grooves G1 and G2 formed on the sintered compact 28 and the molding dies G1' and G2' of the core rod 31 are prevented from interfering with each other. In this way, the bearing sleeve 8 is completed. Note that, in some cases, pore sealing treatment by rotary sizing and the like is performed on the radial bearing surfaces A1 and A2 and the thrust bearing surface B of the bearing sleeve 8 so that a dynamic pressure is more effectively generated. In this case, when pore sealing treatment by rotary sizing is performed while avoiding the middle relief portion E, the surface porosity of the middle relief portion E increases, and hence the lubricating oil is more easily supplied through the middle relief portion E.

The housing 7 is formed, for example, through injection molding of a resin, into a substantially cylindrical shape as illustrated in FIG. 2. An inner peripheral surface 7*a* of the housing 7 is formed to be a cylindrical surface, and the large-diameter outer peripheral surface 8*d*3 of the bearing sleeve 8 is fixed to the inner peripheral surface 7*a* by bonding, press-fitting, press-fitting with interposition of an adhesive, and the like. Further, a radial gap F is formed between the inner peripheral surface 7*a* of the housing 7 and the small-diameter outer peripheral surface 8*d*2 of the bearing sleeve 8. This radial gap F communicates to the radial bearing gaps through intermediation of the radial groove 8*c*1 formed in the upper end surface of the bearing sleeve 8.

The sealing portion 9 is provided integrally with an upper end portion of the housing 7. An inner peripheral surface 9*a* of the sealing portion 9 is formed to be a tapered surface reduced downward in diameter so that a wedge-like sealing space S gradually reduced downward in radial width is formed between the inner peripheral surface 9*a* and the cylindrical outer peripheral surface 2*a*1 of the shaft portion 2*a* of the shaft member 2. A capillary force of the sealing space S prevents leakage of the lubricating oil filling an inside of the housing 7. A lower end surface 9*b* of the sealing portion 9 is held in abutment against the upper end surface 8*c* of the bearing sleeve 8.

The lid member 10 is fixed to a lower end portion of the inner peripheral surface 7*a* of the housing 7 by appropriate means. A thrust bearing surface C is provided on an upper end surface 10*a* of the lid member 10. Spiral-patterned dynamic pressure generating grooves of, for example, a pump-in type are formed in the thrust bearing surface C (not shown).

As described above, by filling the lubricating oil in an interior space of the housing 7 sealed by the sealing portion 9, which comprises inner pores of the bearing sleeve 8, the fluid dynamic bearing device 1 illustrated in FIG. 2 is completed.

In accordance with rotation of the shaft member 2, the radial bearing gaps are formed between the radial bearing surfaces A1 and A2 of the inner peripheral surface 8*a* of the bearing sleeve 8 and the outer peripheral surface 2*a*1 of the shaft portion 2*a*. With this, there are formed radial bearing portions R1 and R2 at which the shaft member 2 is supported in a non-contact manner so as to be freely rotatable in a radial direction by a dynamic pressure generated by increasing pressure of the lubricating oil in those radial bearing gaps with the dynamic pressure generating grooves G1 and G2 in the radial bearing surfaces A1 and A2.

Simultaneously, between the thrust bearing surface B on the lower end surface 8*b* of the bearing sleeve 8 and an upper end surface 2*b*1 of the flange portion 2*b*, and between the thrust bearing surface C on the upper end surface 10*a* of the lid member 10 and a lower end surface 2*b*2 of the flange portion 2*b*, there are respectively formed thrust bearing gaps. With this, there are formed thrust bearing portions T1 and T2 at which the shaft member 2 is supported in a non-contact manner so as to be freely rotatable in both thrust directions by a dynamic pressure generated by increasing pressure of the lubricating oil in those thrust bearing gaps with the dynamic pressure generating grooves 8*b*1 in the thrust bearing surface B and the dynamic pressure generating grooves in the thrust bearing surface C.

Further, in accordance with the rotation of the shaft member 2, the lubricating oil in the middle relief space E0 between the middle relief portion E of the bearing sleeve 8 and the outer peripheral surface 2*a*1 of the shaft portion 2*a* is drawn into the upper radial bearing surface A1 side and the lower radial bearing surface A2 side. Specifically, the dynamic pressure generating grooves G1 of the upper radial bearing surface A1 and the dynamic pressure generating grooves G2 of the lower radial bearing surface A2 (each formed in a herringbone pattern, refer to FIG. 3) cause the lubricating oil in the middle relief space E0 to be drawn into the radial bearing gap of the upper radial bearing portion R1 and the radial bearing gap of the lower radial bearing portion R2. At this time, when the dynamic pressure generating grooves 8*b*1 of the thrust bearing surface B (lower end surface 8*b*) of the bearing sleeve 8 are the pump-in type dynamic pressure generating grooves, as indicated by dotted-line arrows K1 and K2 in FIG. 7, the lubricating oil is induced to flow from a lower side to an upper side of the bearing sleeve 8. The lubricating oil flows into the radial gap F between the small-diameter outer peripheral surface 8*d*2 of the bearing sleeve 8 and the inner peripheral surface 7*a* of the housing 7 via the radial grooves 8*c*1 in the upper end surface 8*c* of the bearing sleeve 8. The lubricating oil that has thus flown into the radial gap F intrudes from the outer peripheral surface 8*d* of the bearing sleeve 8 into the inner pores of the bearing sleeve 8. In this case, the number of the inner pores is larger in the low density portion $P_L$ than in the high density portions $P_H$, and hence the lubricating oil in the radial gap F intrudes mainly from surface pores of the tapered portion 8*d*22 and surface pores of the axial grooves 8*d*1 into the inner pores of the low density portion $P_L$. Then, the lubricating oil that has been impregnated in the inner pores of the low density portion $P_L$ is supplied from surface pores of the middle relief portion E into the middle relief space E0. In this way, a circulation path K1 for the lubricating oil is formed around the upper high density portion $P_H$, and hence the lubricating oil can be efficiently supplied into the middle relief space E0.

Figure 7:
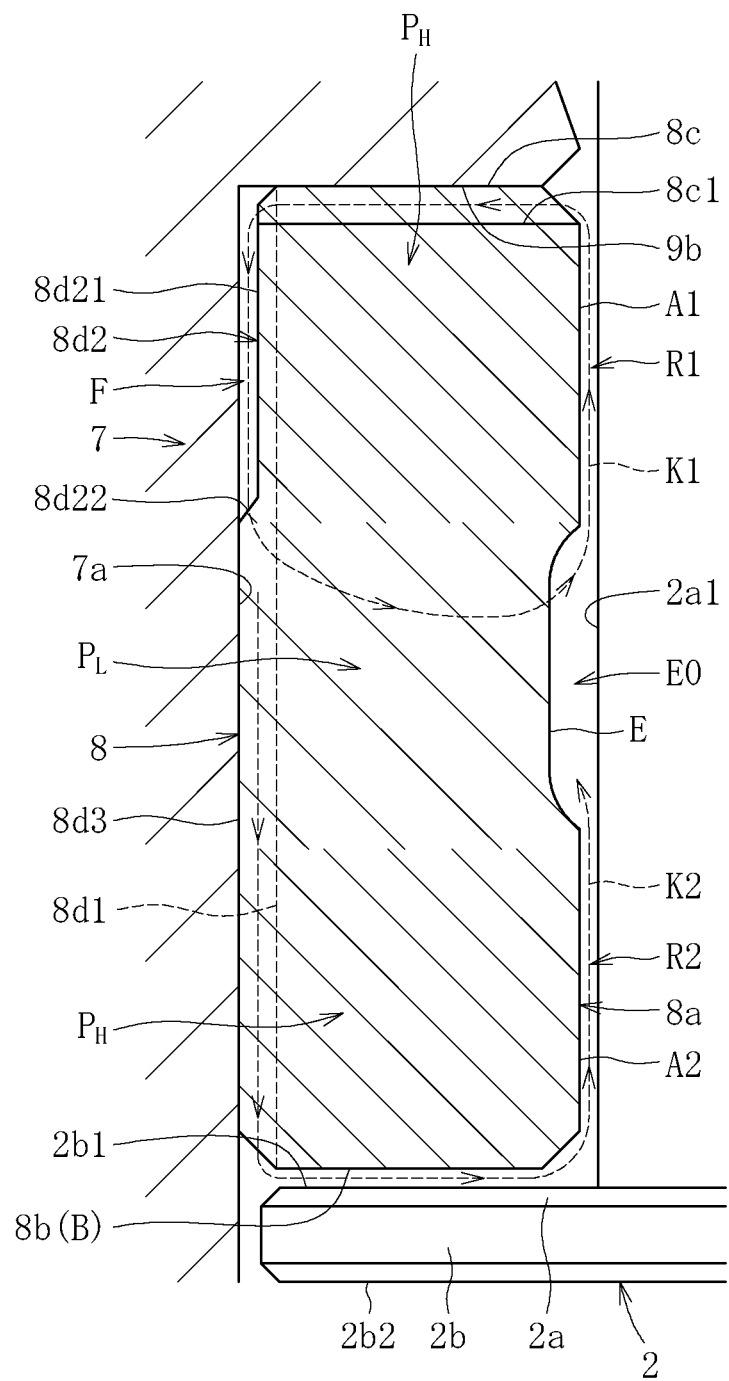
FIG. 7 A sectional view illustrating circulation of a lubricating oil through inner pores of the bearing sleeve.

Further, as indicated by the dotted-line arrow K2 in FIG. 7, a part of the lubricating oil that has reached the radial gap F reaches the lower end surface 8*b* of the bearing sleeve 8 through a communication path formed of the axial groove 8*d*1 of the outer peripheral surface 8d and the inner peripheral surface 7a of the housing 7. This lubricating oil is drawn into the inner diameter side by the pump-in type spiral-patterned dynamic pressure generating grooves 8b1 (refer to FIG. 4), and supplied to the middle relief space E0 via the radial bearing gap of the lower radial bearing portion R2. In this way, a circulation path K2 for the lubricating oil to flow around below the lower high density portion $P_H$ is formed, which enables the lubricating oil to be more efficiently supplied into the middle relief space E0.

The lubricating oil is supplied by an ample amount into the middle relief space E0 through the two types of circulation paths K1 and K2 as described above, and hence generation of negative pressure in the middle relief space E0 is prevented. In particular, in this embodiment, surfaces out of the middle relief portion E of the bearing sleeve 8 comprise surfaces of the high density portions $P_H$ or surfaces fixed to the housing 7, and hence the lubricating oil flows out by a relatively small amount through the surface pores in those regions. Therefore, the lubricating oil can be supplied intensively from the middle relief portion E formed at the low density portion $P_L$. Further, as described above, when the dynamic pressure generating grooves 8b1 of the thrust bearing surface B (lower end surface 8b) of the bearing sleeve 8 are the pump-in type dynamic pressure generating grooves, the dynamic pressure generating grooves 8b1 enable the lubricating oil to be forcibly drawn into the inner diameter side even when the lubricating oil starts to circulate in a direction reverse to the directions indicated by the dotted-line arrows in FIG. 7 for some reason. With this, the lubricating oil can be circulated reliably in the directions indicated by the dotted-line arrows, in other words, in the directions in which the lubricating oil is supplied into the middle relief space E0.

The present invention is not limited to the above-mentioned embodiment. In the following, description is made of other embodiments of the present invention. Parts having the same functions and configurations as those in the above-mentioned embodiment are denoted by the same reference symbols, and redundant description thereof is omitted.

Figure 8:
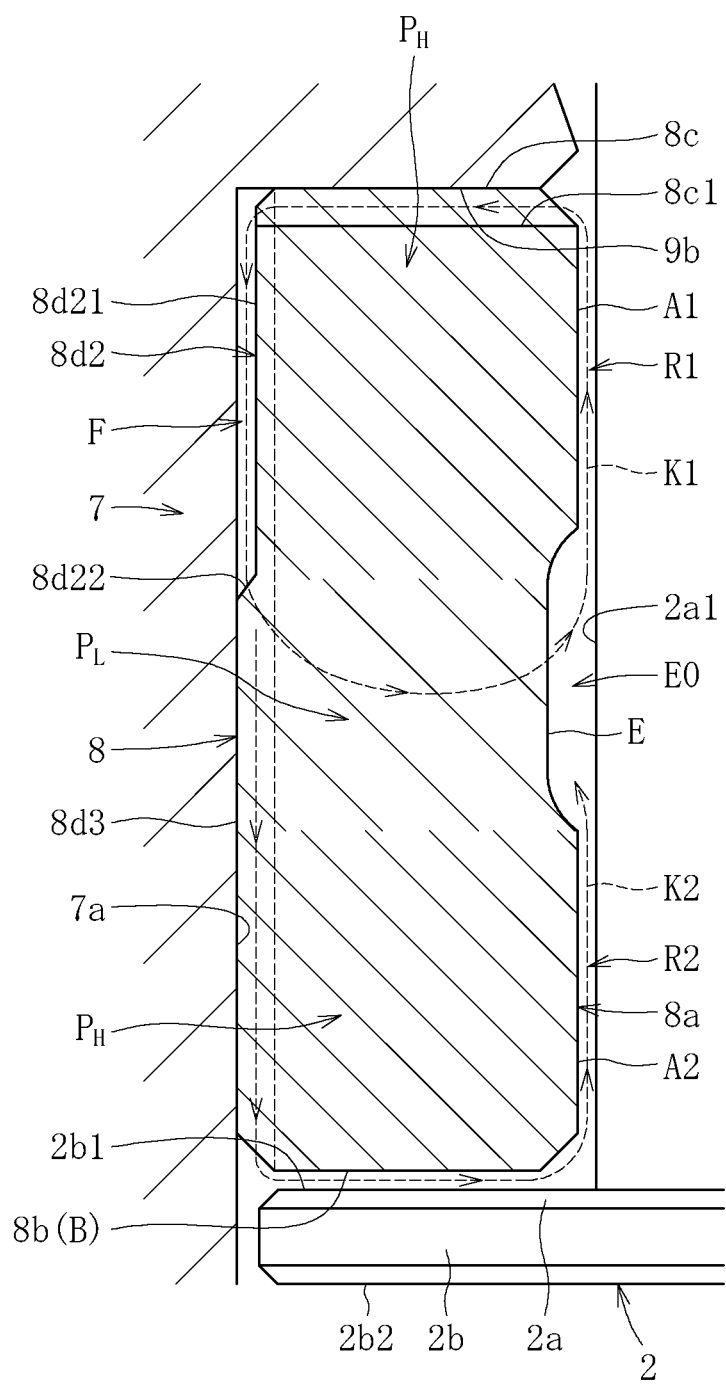
FIG. 8 A sectional view of a bearing sleeve according to another embodiment.

In the case of the above-mentioned embodiment, the lower end portion of the small-diameter outer peripheral surface 8d2 of the bearing sleeve 8 is arranged at substantially the same position in the axial direction as that of the lower end portion of the radial bearing surface A1. However, the present invention is not limited thereto, and the lower end portion of the small-diameter outer peripheral surface 8d2 (in other words, a boundary portion between the small-diameter outer peripheral surface 8d2 and the large-diameter outer peripheral surface 8d3) may be provided above or below the lower end portion of the radial bearing surface A1. For example, as illustrated in FIG. 8, when the lower end portion of the small-diameter outer peripheral surface 8d2 is extended down to an axial region of the middle relief portion E, the radial gap F comes closer to the middle relief portion E in comparison with that in the case illustrated in FIG. 7. Thus, the circulation along the dotted-line arrow K1 on the upper side easily occurs.

Figure 9:
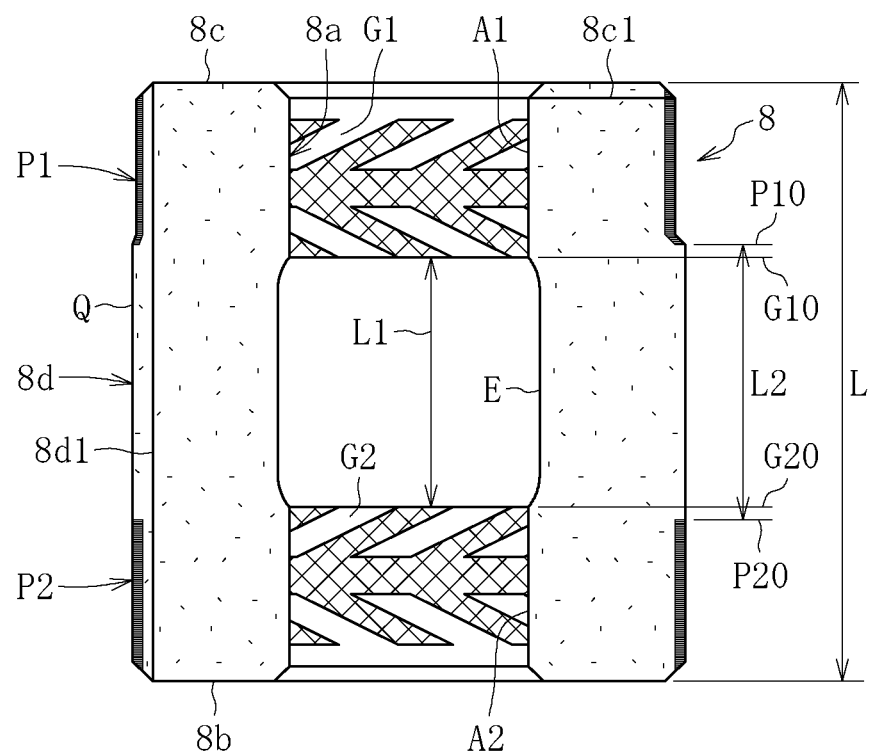
FIG. 9 A sectional view of a bearing sleeve according to still another embodiment.

Further, in a case illustrated in FIG. 9, the dynamic pressure generating grooves G1 and G2 to be formed in the inner peripheral surface 8a of the bearing sleeve 8 are formed by compressing parts of an axial region of the outer peripheral surface 8d so that the inner peripheral surface 8a is pressed onto the molding dies (for details, refer to description hereinbelow). As a result, of this compression, compression marks are left in the parts of the axial region of the outer peripheral surface 8d of the bearing sleeve 8. In this embodiment, as illustrated in FIG. 9, a compression mark P1 formed on the outer diameter side with respect to the upper radial bearing surface A1 and a compression mark P2 formed on the outer diameter side with respect to the lower radial bearing surface A2 are formed apart from each other in the axial direction. The compression marks P1 and P2 are regions subjected to a high compressive force during manufacturing steps for the bearing sleeve 8 (particularly in the step of forming the dynamic pressure generating grooves G1 and G2), and hence are smaller in surface porosity than an uncompressed region Q between the compression marks P1 and P2 in the axial direction.

Figure 13:
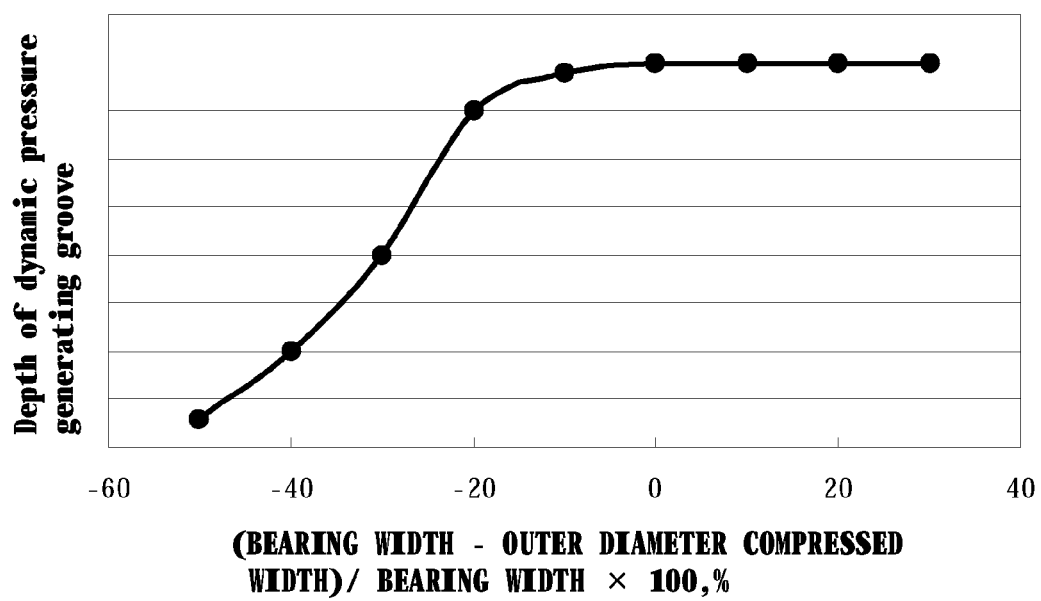
FIG. 13 A graph showing a relationship between an axial distance between a lower end surface of a radial bearing surface A1 and a lower end portion of a compression imprint P1 and a depth of dynamic pressure generating grooves.

The region in which the upper compression mark P1 is formed is smaller in diameter than the uncompressed region Q. In this embodiment, this region comprises a tapered portion reduced upward in diameter and a cylindrical portion provided above the tapered portion. An upper end portion of the compression mark P1 reaches an upper end of the outer peripheral surface 8d of the bearing sleeve 8. Meanwhile, a lower end portion P10 of the compression mark P1 falls within a range of the region in which the dynamic pressure generating grooves G1 are formed on the upper radial bearing surface A1. In other words, the lower end portion P10 of the compression mark P1 is positioned above a lower end portion G10 of the region in which the dynamic pressure generating grooves G1 are formed. At this time, in order that the dynamic pressure generating grooves G1 are formed reliably down to the end portion with compression of the outer peripheral surface 8d of the bearing sleeve 8, it is preferred that an axial distance between the lower end portion P10 of the compression mark P1 and the lower end portion G10 of the dynamic pressure generating grooves G1 be as small as possible. FIG. 13 is a graph showing a relationship between a ratio of the axial distance and a bearing width (axial dimension of the upper radial bearing surface A1) and a groove depth of the dynamic pressure generating grooves G1. This graph shows that the depth of the dynamic pressure generating grooves can be sufficiently secured as long as the axial distance is 10% or less of the axial dimension of the upper radial bearing surface A1.

The region in which the lower compression mark P2 is formed has a shape of a cylindrical surface having a diameter equal to (or slightly larger than) that of the uncompressed region Q. A lower end portion of the compression mark P2 reaches a lower end of the outer peripheral surface 8d of the bearing sleeve 8. Meanwhile, an upper end portion P20 of the compression mark P2 falls within a range of the region in which the dynamic pressure generating grooves G2 are formed on the lower radial bearing surface A2. In other words, the upper end portion P20 of the compression mark P2 is positioned below an upper end portion G20 of the region in which the dynamic pressure generating grooves G2 are formed. At this time, in order that the dynamic pressure generating grooves G2 are formed reliably up to the end portion, it is preferred that an axial distance between the upper end portion P20 of the compression mark P2 and the upper end portion G20 of the dynamic pressure generating grooves G2 be as small as possible. Specifically, it is preferred that this axial distance be set to 10% or less of an axial dimension of the lower radial bearing surface A2.

Figure 10A:
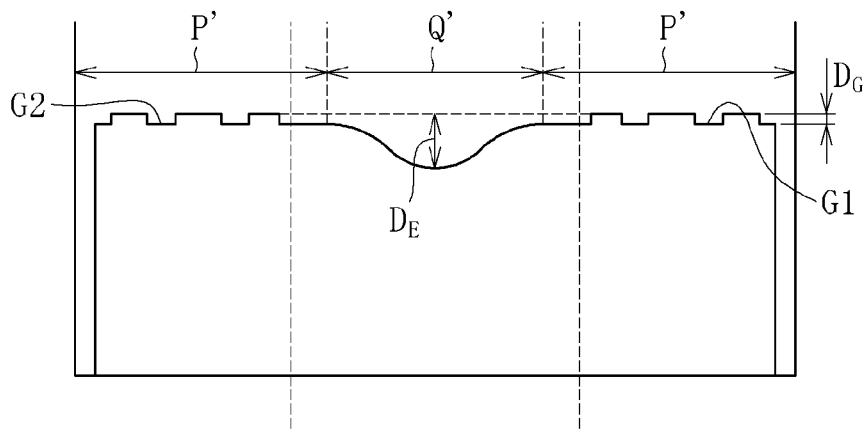
FIG. 10a A view illustrating a shape of an inner peripheral surface of a bearing member in a case where an outer peripheral surface is compressed over a range larger than a region in which a dynamic pressure generating portion is formed.
Figure 10B:
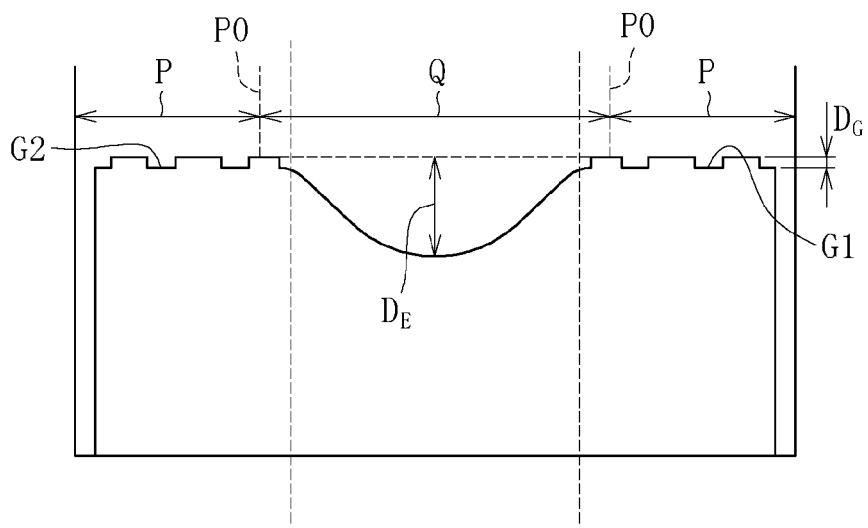
FIG. 10b Another view illustrating the shape of the inner peripheral surface of the bearing member in a case where the outer peripheral surface is compressed within the region in which the dynamic pressure generating portion is formed.
Figure 10C:
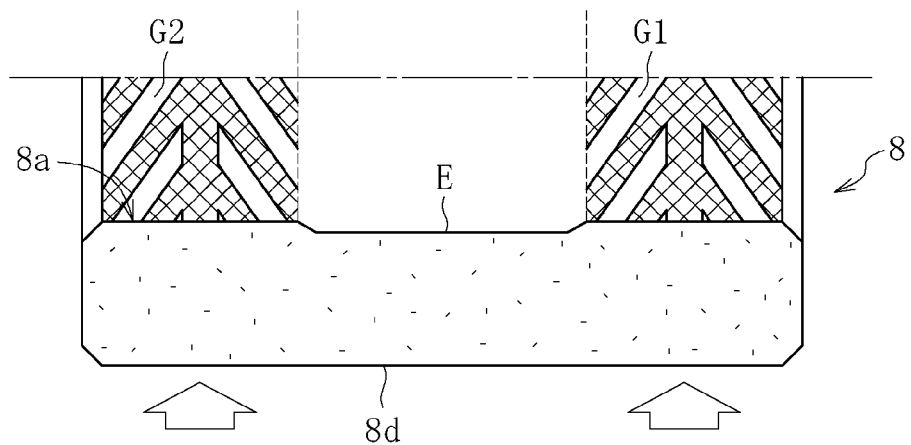
FIG. 10c A sectional view of the bearing member, which corresponds to FIGS. 10(a) and 10(b).
Figure 11:
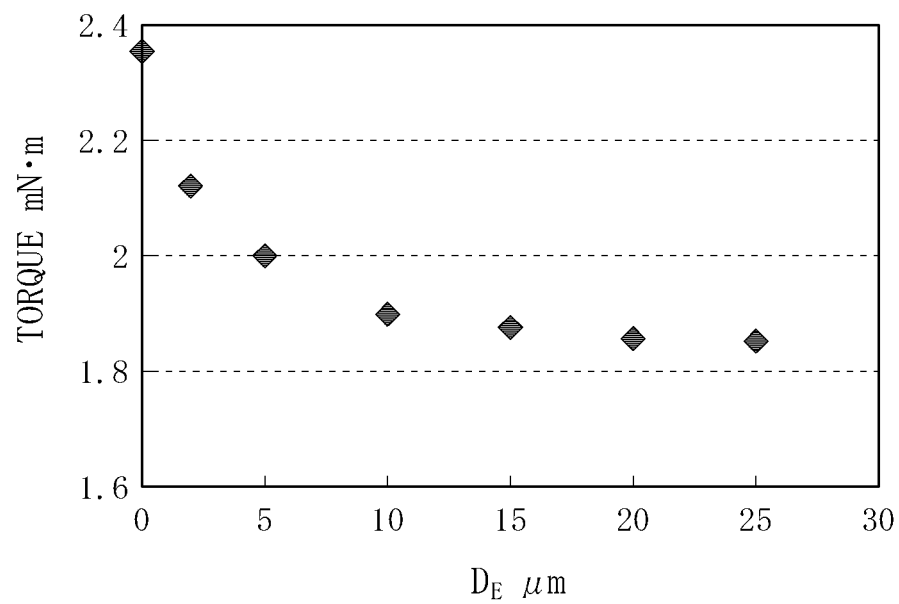
FIG. 11 A graph showing a change in rotational torque of a shaft member with respect to a relief depth $D_E$ of a middle relief portion.

In this context, FIG. 11 shows a change in rotational torque with respect to a relief depth $D_E$ of the middle relief portion E (difference in diameter between a deepest portion of the middle relief portion E and the hill portions of the radial bearing surfaces A1 and A2, refer to FIG. 10). FIG. 11 shows that the rotational torque of the shaft member is stabilized as long as the relief depth $D_E$ is 10 μm or more. In this embodiment, a groove depth $D_G$ of each of the dynamic pressure generating grooves G1 and G2 (difference in diameter between the dynamic pressure generating grooves G1 and G2 and the hill portions) is approximately 2 μm, and hence it suffices that the relief depth $D_E$ is set to be four times or more larger than the groove depth $D_G$.

Figure 12:
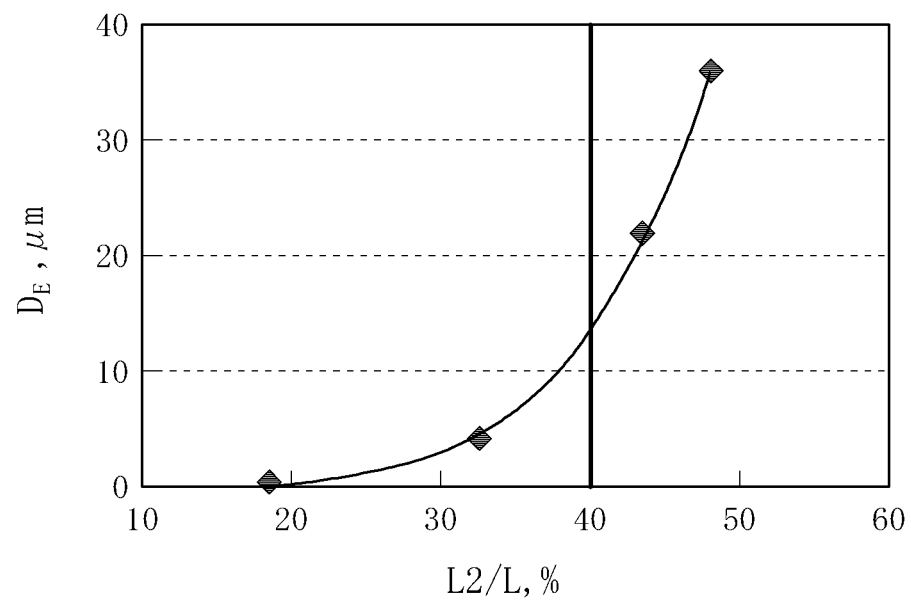
FIG. 12 A graph showing a change of the relief depth $D_E$ of the middle relief portion with respect to (axial distance L2 between compressed portions)/(axial dimension L of the bearing member).

Further, FIG. 12 is a graph showing a change of the relief depth $D_E$ of the middle relief portion E with respect to a ratio of an axial distance L2 of the uncompressed region Q and an axial dimension L of the bearing sleeve 8 (L2/L, %). This graph shows that, in order to set the relief depth $D_E$ to 10 μm or more, it suffices that an axial gap between the compression marks P1 and P2, in other words, the axial distance L2 of the uncompressed region Q is set to 40% or more of the axial dimension L of the bearing sleeve 8. In this case, when an axial clearance L1 between the radial bearing surfaces A1 and A2 is excessively small, compressing regions are excessively small with respect to the radial bearing surfaces A1 and A2, which leads to a risk that the dynamic pressure generating grooves G1 and G2 cannot be formed with high accuracy. As a countermeasure, it is preferred that the axial clearance L1 between the radial bearing surfaces A1 and A2 be set to 30% or more of the axial dimension L of the bearing sleeve 8.

The bearing sleeve 8 illustrated in FIG. 9 is manufactured by substantially the same method as that in the above-mentioned embodiment. Note that, under the state illustrated in FIG. 6(*a*), the lower end portion (shoulder surface 28*d*3 in the illustration) of the large-diameter outer peripheral surface 28*d*2 of the sintered compact 28 falls within an axial region of the molding die G2', in other words, the shoulder surface 28*d*3 is positioned above the lower end portion of the molding die G2'. Further, under the state illustrated in FIG. 6(*b*), an upper end portion of the narrow portion 32*a*2 of the die 32 (upper end portion of the tapered portion 32*a*21 in the illustration) falls within an axial region of the lower molding die G1', in other words, the upper end portion of the narrow portion 32*a*2 is positioned below an upper end portion of the molding die G1'.

Further, in the above-mentioned embodiments, the radial dynamic pressure generating portions on the inner peripheral surface 8*a* of the bearing sleeve 8 are each formed of the dynamic pressure generating grooves in a herringbone pattern, but the present invention is not limited thereto. For example, the radial dynamic pressure generating portions may be formed of dynamic pressure generating grooves in other patterns (such as step pattern), or by forming the inner peripheral surface 8*a* of the bearing sleeve 8 into a multi-arc shape formed of a plurality of circular arcs combined with each other.

Further, in the above-mentioned embodiments, a thrust dynamic pressure generating portion on the lower end surface 8*b* of the bearing sleeve 8 is formed of the dynamic pressure generating grooves in a spiral pattern, but the present invention is not limited thereto. For example, the thrust dynamic pressure generating portion may be formed of dynamic pressure generating grooves in other patterns (such as herringbone pattern and step pattern).

REFERENCE SIGNS LIST

1 fluid dynamic bearing device
2 shaft member
7 housing
8 bearing sleeve (bearing member)
9 sealing portion
10 lid member
A1, A2 radial bearing surface
B, C thrust bearing surface
E middle relief portion
E0 middle relief space
F radial gap
G1, G2 dynamic pressure generating groove
$P_H$ high density portion
$P_L$ low density portion
R1, R2 radial bearing portion
T1, T2 thrust bearing portion
S sealing space

The invention claimed is:

1. A bearing member formed of a sintered metal, comprising:
   a first radial bearing surface provided on an inner peripheral surface;
   a second radial bearing surface provided on the inner peripheral surface, the second radial bearing surface is spaced apart to from the first radial bearing surface;
   a first radial dynamic pressure generating portion formed on the first radial bearing surface;
   a second radial dynamic pressure generating portion formed on the second radial bearing surface;
   end surfaces provided at both axial ends of the bearing member;
   a thrust bearing surface provided on at least one of the end surfaces;
   a thrust dynamic pressure generating portion formed on the thrust bearing surface;
   a middle relief portion provided between the first radial bearing surface and the second radial bearing surface in the axial direction, the middle relief portion being larger in diameter than the radial bearing surfaces;
   a first compression mark on the outer peripheral surface of the bearing member, the first compression mark formed in an axial region of the first radial dynamic pressure generating portion; and
   a second compression mark on the outer peripheral surface of the bearing member, the second compression mark formed in an axial region of the second radial dynamic pressure generating portion, wherein
   a first end of the first compression mark is positioned above a first end of the first radial dynamic pressure generating portion,
   wherein a second end of the second compression mark is positioned below a second end of the second radial dynamic pressure generating portion, wherein
   the first end of the first compression mark is a lower end of the first compression mark,
   the first end of the first radial dynamic pressure generating portion is a lower end of the first radial dynamic pressure generating portion,
   the second end of the second compression mark is an upper end of the second compression mark, and
   the second end of the second radial dynamic pressure generating portion is an upper end of the second radial dynamic pressure generating portion.

2. The bearing member according to claim 1, further comprising:
   high density portions; and
   a low density portion,
   wherein a density of the sintered metal in the high density portions is higher than a density of the sintered metal in the low density portion
   wherein the radial bearing surfaces are formed respectively on inner peripheral surfaces of the high density portions, and
   wherein the middle relief portion is formed on an inner peripheral surface of the low density portion.

3. A fluid dynamic bearing device, comprising:
the bearing member according to claim 2;
a shaft member comprising:
  a shaft portion inserted along an inner periphery of the bearing member; and
  a flange portion projected from the shaft portion to an outer diameter side,
wherein radial bearing gaps are formed between the radial bearing surfaces of the bearing member and an outer peripheral surface of the shaft portion, and
wherein a thrust bearing gap is formed between the thrust bearing surface of the bearing member and an end surface of the flange portion.

4. The bearing member according to claim 2, wherein the radial dynamic pressure generating portions are formed by compressing parts of a region of an outer peripheral surface to an inner diameter side so that the inner peripheral surface is pressed onto molding dies.

5. A fluid dynamic bearing device, comprising:
the bearing member according to claim 4;
a shaft member comprising:
  a shaft portion inserted along an inner periphery of the bearing member; and
  a flange portion projected from the shaft portion to an outer diameter side,
wherein radial bearing gaps are formed between the radial bearing surfaces of the bearing member and an outer peripheral surface of the shaft portion, and
wherein a thrust bearing gap is formed between the thrust bearing surface of the bearing member and an end surface of the flange portion.

6. The bearing member according to claim 1, wherein the radial dynamic pressure generating portions are each formed into a symmetrical shape in the axial direction.

7. A fluid dynamic bearing device, comprising:
the bearing member according to claim 6;
a shaft member comprising:
  a shaft portion inserted along an inner periphery of the bearing member; and
  a flange portion projected from the shaft portion to an outer diameter side,
wherein radial bearing gaps are formed between the radial bearing surfaces of the bearing member and an outer peripheral surface of the shaft portion, and
wherein a thrust bearing gap is formed between the thrust bearing surface of the bearing member and an end surface of the flange portion.

8. The bearing member according to claim 1, wherein the thrust dynamic pressure generating portion is a pump-in type thrust dynamic pressure generating portion which draws the lubricating oil from an outer diameter side to an inner diameter side.

9. A fluid dynamic bearing device, comprising:
the bearing member according to claim 8;
a shaft member comprising:
  a shaft portion inserted along an inner periphery of the bearing member; and
  a flange portion projected from the shaft portion to an outer diameter side,
wherein radial bearing gaps are formed between the radial bearing surfaces of the bearing member and an outer peripheral surface of the shaft portion, and
wherein a thrust bearing gap is formed between the thrust bearing surface of the bearing member and an end surface of the flange portion.

10. The bearing member according to claim 1, further comprising an axial groove formed in an outer peripheral surface.

11. A fluid dynamic bearing device, comprising:
the bearing member according to claim 10;
a shaft member comprising:
  a shaft portion inserted along an inner periphery of the bearing member; and
  a flange portion projected from the shaft portion to an outer diameter side,
wherein radial bearing gaps are formed between the radial bearing surfaces of the bearing member and an outer peripheral surface of the shaft portion, and
wherein a thrust bearing gap is formed between the thrust bearing surface of the bearing member and an end surface of the flange portion.

12. A fluid dynamic bearing device, comprising:
the bearing member according to claim 1;
a shaft member comprising:
  a shaft portion inserted along an inner periphery of the bearing member; and
  a flange portion projected from the shaft portion to an outer diameter side,
wherein radial bearing gaps are formed between the radial bearing surfaces of the bearing member and an outer peripheral surface of the shaft portion, and
wherein a thrust bearing gap is formed between the thrust bearing surface of the bearing member and an end surface of the flange portion.

13. The fluid dynamic bearing device according to claim 12, comprising a housing having an inner peripheral surface to which the bearing member is fixed,
wherein the outer peripheral surface of the bearing member comprises:
  a large-diameter outer peripheral surface fixed to the inner peripheral surface of the housing; and
  a small-diameter outer peripheral surface to form a radial gap between the small-diameter outer peripheral surface and the inner peripheral surface of the housing, the radial gap being communicated to the radial bearing gaps.

14. The fluid dynamic bearing device according to claim 13, wherein the thrust bearing surface is formed on an end surface of the bearing member on the large-diameter outer peripheral surface side.

15. The fluid dynamic bearing device according to claim 13, further comprises:
high density portions; and
a low density portion,
  wherein a density of the sintered metal in the high density portion is higher than a density of the sintered metal in the low density portion,
  wherein the small-diameter outer peripheral surface is formed on an outer peripheral surface of one of the high density portions, and
  wherein the large-diameter outer peripheral surface is formed on an outer peripheral surface of the low density portion.

16. The fluid dynamic bearing device according to claim 13, wherein a boundary portion between the small-diameter outer peripheral surface and the large-diameter outer peripheral surface falls within a range in the axial direction of the middle relief portion.

17. The fluid dynamic bearing device according to claim 12, wherein any radial dynamic pressure generating portion is not formed on the outer peripheral surface of the shaft portion, and the outer peripheral surface of the shaft portion is formed to be a cylindrical surface.

18. The fluid dynamic bearing device according to claim 17 wherein the shaft member is formed by bonding the shaft portion and the flange portion separately formed to each other.

19. A bearing member formed of a sintered metal, comprising:

a first radial bearing surface provided on an inner peripheral surface;

a second radial bearing surface provided on the inner peripheral surface, the second radial bearing surface is spaced apart to from the first radial bearing surface;

a first radial dynamic pressure generating portion formed on the first radial bearing surface;

a second radial dynamic pressure generating portion formed on the second radial bearing surface;

a first compression mark left on the outer peripheral surface of the bearing member, the first compression mark is formed in an axial region of the first radial dynamic pressure generating portion; and a second compression mark left on the outer peripheral surface of the bearing member, the second compression mark is formed in an axial region of the second radial dynamic pressure generating portion, wherein a first end of the first compression mark is positioned above a first end of the first radial dynamic pressure generating portion, wherein a second end of the second compression mark is positioned below a second end of the second radial dynamic pressure generating portion, wherein the first end of the first compression mark is a lower end of the first compression mark, the first end of the first radial dynamic pressure generating portion is a lower end of the first radial dynamic pressure generating portion, the second end of the second compression mark is an upper end of the second compression mark, and the second end of the second radial dynamic pressure generating portion is an upper end of the second radial dynamic pressure generating portion.

* * * * *